United States Patent
Strubel et al.

(10) Patent No.: US 10,328,979 B2
(45) Date of Patent: Jun. 25, 2019

(54) CONNECTING DEVICE FOR CONNECTING AN ADJUSTABLE SPOILER BLADE TO A VEHICLE

(71) Applicant: Dr. Ing. h.c. F. Porsche Aktiengesellschaft, Stuttgart (DE)

(72) Inventors: Sebastian Strubel, Pforzheim (DE); Haiko Neher, Sachsenheim (DE); Bernd Kasperowski, Schwieberdingen (DE); Uwe Heller, Vaihingen/Enz (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 22 days.

(21) Appl. No.: 15/713,726

(22) Filed: Sep. 25, 2017

(65) Prior Publication Data
US 2018/0093712 A1    Apr. 5, 2018

(30) Foreign Application Priority Data
Oct. 5, 2016    (DE) ........................ 10 2016 118 890

(51) Int. Cl.
| B60J 9/00 | (2006.01) |
| B62D 27/02 | (2006.01) |
| B62D 35/00 | (2006.01) |
| B62D 37/02 | (2006.01) |

(52) U.S. Cl.
CPC ........... *B62D 27/023* (2013.01); *B62D 35/00* (2013.01); *B62D 37/02* (2013.01)

(58) Field of Classification Search
CPC .... Y02T 10/82; B62D 35/007; B62D 35/005; B60S 1/3808; B60S 1/381; B60S 1/3879; B60S 1/3877; B60S 2001/4054
USPC ..................... 296/180.1, 180.2, 180.3, 180.5
See application file for complete search history.

(56) References Cited

U.S. PATENT DOCUMENTS

| 4,274,670 | A | * | 6/1981 | Pitzmann | .................. B60J 5/101 296/180.1 |
| 4,558,898 | A | * | 12/1985 | Deaver | ................ B62D 35/007 296/180.1 |
| 5,141,281 | A | * | 8/1992 | Eger | .................... B62D 35/007 296/180.5 |
| 5,346,274 | A | * | 9/1994 | Syamal | ................... B60R 19/00 296/180.1 |
| 7,111,898 | B2 | * | 9/2006 | Rinklin | ................ B62D 35/007 296/180.1 |
| 7,841,646 | B2 | * | 11/2010 | Paul | ..................... B62D 35/007 296/180.1 |

(Continued)

*Primary Examiner* — Kiran B Patel
(74) *Attorney, Agent, or Firm* — Leydig, Voit & Mayer, Ltd.

(57) ABSTRACT

A connecting device for connecting an adjustable spoiler blade to a vehicle includes a basic body including: a fastening interface having a Z clearance in a Z direction for fastening to spoiler kinematics of the vehicle in at least two different Z relative positions with respect to the spoiler kinematics, wherein an alignment body is fastened to the basic body, and an alignment interface having an XY clearance in an X direction and a Y direction for fastening in at least two different XY relative positions with respect to the basic body. The basic body has a spoiler interface for fastening of the spoiler blade and furthermore at least one adjuster for setting a Z relative position.

9 Claims, 5 Drawing Sheets

(56) References Cited

U.S. PATENT DOCUMENTS

| | | | | |
|---|---|---|---|---|
| 8,602,486 | B2* | 12/2013 | Roemer | B62D 35/007 296/180.5 |
| 8,950,798 | B2* | 2/2015 | Inubushi | B62D 35/007 296/180.1 |
| 9,102,367 | B1* | 8/2015 | Beierl | B62D 35/007 |
| 10,040,492 | B2* | 8/2018 | Cha | B62D 37/02 |
| 2003/0090126 | A1* | 5/2003 | Adams | B62D 35/007 296/180.1 |
| 2006/0006694 | A1* | 1/2006 | Hillgaertner | B62D 35/007 296/180.1 |
| 2007/0145776 | A1* | 6/2007 | Grave | B62D 35/007 296/180.5 |
| 2009/0160213 | A1* | 6/2009 | Paul | B62D 35/007 296/180.1 |
| 2011/0169298 | A1* | 7/2011 | Goenueldinc | B62D 35/007 296/180.1 |
| 2011/0169299 | A1* | 7/2011 | Goenueldinc | B62D 35/007 296/180.5 |
| 2012/0223545 | A1* | 9/2012 | Goenueldinc | B62D 35/007 296/180.5 |
| 2014/0346810 | A1* | 11/2014 | Wild | B62D 35/007 296/180.5 |
| 2018/0079456 | A1* | 3/2018 | Charpentier | B62D 35/007 |
| 2018/0105100 | A1* | 4/2018 | Erb | B60Q 1/22 |

\* cited by examiner

CONNECTING DEVICE FOR CONNECTING AN ADJUSTABLE SPOILER BLADE TO A VEHICLE

CROSS REFERENCE TO RELATED APPLICATIONS

This application claims benefit to German Patent Application No. DE 10 2016 118 890.5, filed Oct. 5, 2016, which is hereby incorporated by reference herein.

FIELD

The present invention relates to a connecting device for connecting an adjustable spoiler blade to a vehicle, and to a method for connecting an adjustable spoiler blade to a vehicle.

BACKGROUND

It is known that vehicles are equipped with spoiler blades in order to be able to improve or influence the aerodynamic situation of the vehicle. Such spoiler blades are customarily configured to be adjustable. Sports cars are thus known, in which spoiler blades can be moved to and fro between a passive retracted position and an active extended position. In order to be able to carry out this movement between passive and active position, spoiler kinematics are customarily provided. The movement can be carried out by means of individual levers, and therefore the spoiler blade can be brought into an active position influencing the air flow. In a parking situation or at slow speeds, the spoiler blade can be retracted again via the same spoiler kinematics.

SUMMARY

In an embodiment, the present invention provides a connecting device for connecting an adjustable spoiler blade to a vehicle. The connecting device includes a basic body including: a fastening interface having a Z clearance in a Z direction for fastening to spoiler kinematics of the vehicle in at least two different Z relative positions with respect to the spoiler kinematics, wherein an alignment body is fastened to the basic body, and an alignment interface having an XY clearance in an X direction and a Y direction for fastening in at least two different XY relative positions with respect to the basic body. The basic body has a spoiler interface for fastening of the spoiler blade and furthermore at least one adjuster for setting a Z relative position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

A disadvantage of the known solutions is that an alignment of the spoiler blade relative to the spoiler kinematics is possible only with great complexity. Use is customarily made here of adjustment screws having screw blades in order to set the spoiler blade relative to the spoiler kinematics in up to four or more setting positions. The setting is focused here firstly on achieving as uniform and constant an alignment of the spoiler blade as possible. Secondly, it is desirable for as constant and uniform a joint pattern as possible to arise in the passive position of the spoiler blade. However, because of the many differently positioned setting points, this has the effect that distortions in the spoiler blade or high tolerances for avoiding such distortions occur.

An aspect of the present invention at least partially eliminates the above-described disadvantages. In particular, it is an aspect of the present invention to fasten a spoiler blade to spoiler kinematics with as little distortion as possible and in an aligned manner cost-effectively and simply.

Connecting devices according to embodiments of the invention serve for connecting an adjustable spoiler blade to a vehicle. For this purpose, connecting devices according to embodiments of the invention have a basic body with a fastening interface having a Z clearance in a Z direction for fastening to spoiler kinematics of the vehicle in at least two different Z relative positions with respect to the spoiler kinematics. An alignment body is fastened to the basic body, with an alignment interface having an XY clearance in an X direction and a Y direction for fastening in at least two different XY relative positions with respect to the basic body. Furthermore, the basic body is equipped with a spoiler interface for the fastening of the spoiler blade. Furthermore, the basic body has at least one setting means for setting the Z relative position.

The setting possibilities and the fastening possibilities of the spoiler blade to the spoiler kinematics are now combined in one component, namely in particular in the basic body of the connecting device. The basic body serves as it were as a compensating interface between the spoiler blade, on the one hand, and the spoiler kinematics, on the other hand. Said basic body is now capable of aligning or setting the correlation or the relative position between the spoiler blade and the spoiler kinematics by means of the corresponding interfaces and the alignments thereof. Within the context of the present invention, reference is made to a system of coordinates having three axes, namely the X direction, the Y direction and the Z direction. This cartesian system of coordinates is defined by the three axes, wherein the X and Y axes define an XY plane which is aligned substantially parallel or along the surface of the spoiler blade. The associated Z direction of this system of coordinates is perpendicular to the XY plane and is accordingly configured substantially vertically or perpendicularly to the surface of the spoiler blade.

A connecting device for connecting an adjustable spoiler blade can be used in a manner according to an embodiment of the invention. This connecting operation is briefly explained below so that the advantages of a connecting device according to the embodiments of the invention are clearly apparent.

A connecting device can be provided in a preassembled manner. One such connecting device is thus preferably connected in each case on both sides of spoiler kinematics to the spoiler kinematics with the aid of the fastening interface of the respective basic body. In order now to carry out an alignment, the alignment body can be used with the aid of what is referred to as a spoiler gauge or an alignment aid. In order to ensure that a uniform joint pattern arises in the XY alignment when the spoiler blade is attached later, not only is the spoiler blade itself now aligned, but so too is an associated alignment body. The alignment body here has an outer contour which, upon the later installation of the spoiler blade, can engage at least in sections in a form-fitting manner in a corresponding receptacle of the spoiler blade. By means of the unambiguous and specific correlation of the position of the alignment body with an associated unambiguous and specific position of the spoiler blade, by pre-alignment of the alignment body the spoiler blade to be fitted later can also be automatically aligned therewith.

For an alignment in the XY direction, for the setting of the uniform joint pattern, the alignment body is therefore now displaced along its alignment interface until it is at the desired relative position with respect to the basic body. For this purpose, the alignment interface can have, for example, an opening which has a larger opening cross section than an associated fastening means, for example in the form of a screw. Of course, more complex solutions are also conceivable, and therefore the alignment interface has, for example, a combination of two elongate holes arranged perpendicularly to each other, and accordingly a cross-shaped opening contour. If the alignment body is now in the desired aligned position, the fastening in said aligned position can take place with the aid of the fastening means. In order then subsequently also to be able to provide an alignment in the Z direction, the fastening between the basic body via the fastening interface to the spoiler kinematics has to be released to an extent such that the Z clearance of the respective fastening interface is activated again. In other words, an elongate hole or an enlarged opening is also provided here, which permits a relative movement at the respective fastening interface between the basic body and the spoiler kinematics when the fastening means is loosened. In order now to be able to provide the setting in the Z direction in a defined manner, in the case of a connecting device according to an embodiment of the invention setting means are provided, in particular at least one setting means which carries out said setting in the Z direction. As is also explained later on, for this purpose the setting means can have, for example, an external screw or an internal screw, and therefore, by corresponding relative rotation with the setting means and the associated thread pitch, a relative movement for the setting in the Z direction can be provided in a defined manner. As soon as the setting in the Z direction has also been completed successfully, the corresponding fastening means are again tightened at the fastening interfaces, and therefore the basic body is fixed in its Z relative position relative to the spoiler kinematics by fastening.

Subsequently, the spoiler blade is attached and fastened via associated spoiler interfaces such that the installation operation can be completed.

As is apparent from the above explanation, the fastening and alignment functionality can be placed in the connecting device according to an embodiment of the invention. This has the effect that in particular the alignment in the XY direction and the setting in the Z direction can be separated. This separation has the effect that undesirable distortions in the spoiler blade can be substantially entirely avoided. This is in particular the case whenever the corresponding stop surfaces for the spoiler blade on the basic body have a flat or substantially flat alignment.

It can be of advantage if, in the case of a connecting device according to an embodiment of the invention, the Z clearance of the fastening interface and/or the XY clearance of the alignment interface are configured for a free selection of a Z relative position and/or an XY relative position between in each case two end positions. Reference has already been made in the above paragraphs to various possibilities of designing the respective clearance. In particular, it involves enlarged opening cross sections, and therefore a relative displacement can take place at the respective clearance when the fastening means is loosened. At least two end positions are provided here by the outer contour of the respective opening cross section. If the respective clearance of the respective interface is a round opening cross section, this outer contour forms a substantially endless multiplicity of corresponding end positions. The associated relative position can now be freely selected within said opening cross section and finally fixed with the associated fastening means. As a result of the fact that a free selection between said at least two, preferably a multiplicity of, end positions is available, the setting variability and therefore the flexibility of the setting or the alignment is increased by a multiple, and at the same time the setting and the alignment are simplified.

It is furthermore advantageous if, in the case of a connecting device according to an embodiment of the invention, the Z clearance and/or the XY clearance have/has an opening cross section which is greater than the outer cross section of an associated fastening means. A possibility is therefore provided of creating the associated clearance functionality. As has already been explained, the opening cross section in the respective interface is conceived for an associated fastening means to be able to protrude through said opening cross section. The outer contour and therefore the outer diameter of the associated fastening means can now be moved within the relatively large opening contour or the relatively large opening cross section of the associated interface until the side surfaces of the outer contour of the fastening means contact the side walls of the opening cross section of the interface. Therefore, a free relative movement is possible within the opening cross section, as is required, according to claim 1, for the selection of at least two different relative positions. A design with corresponding relations of the opening cross sections results in a particularly simple and cost-effective refinement of a connecting device according to an embodiment of the invention.

It is likewise of advantage if, in the case of a connecting device according to an embodiment of the invention, at least two setting means, in particular having setting threads, are arranged on two different sides of the alignment body. The setting means, in particular with a setting thread, serves to provide a setting movement by means of a defined movement of the setting means. If the setting means have threads, an associated translation can be provided by a rotational movement of the setting means, for example if the associated setting means is supported with an end portion against a lug-shaped latching projection of the spoiler kinematics. By rotation of the respective setting means, an alignment or a setting in the Z direction for a Z relative position of the basic body with respect to the spoiler kinematics can now be provided. The statement that at least one setting means is arranged in each case on both sides of the alignment body results in a symmetrical embodiment, in particular in respect of the adjustment or of the setting in the Z direction. The setting in the Z direction for the spoiler blade can be lower in deformation and accordingly lower in torsion the more symmetrically the setting is carried out.

It can be a further advantage if, in the case of a connecting device according to an embodiment of the invention, the at least one setting means has a contact portion for force-transmitting contact with a contact means for carrying out the setting of the Z relative position, wherein the contact portion is arranged on a different side of the basic body than the alignment body. The contact portion serves, for example with the aid of a contact means or a tool, to be able to carry out the setting movement at the setting means. For example, the contact portion can have a wrench width in order to be able to provide a corresponding contact connection with a fork wrench. Owing to the fact that the contact portion lies on a different side than the alignment body, the contact portion can be reached even if the alignment body or the side of the basic body on which the alignment body is arranged is already covered by the spoiler blade. This has the effect that, at least in the extended active position of the spoiler blade, access is possible from the lower side to the contact portions of the setting means, and therefore, even when a spoiler blade is fitted, a retrospective readjustment or setting in the Z direction can still be provided.

It can likewise be of advantage if, in the case of a connecting device according to an embodiment of the invention, a fastening axis of the fastening interface is aligned transversely with respect to the alignment axis of the alignment interface and/or transversely with respect to the setting axis of the at least one setting means. The individual axes are preferably aligned not only transversely, but also perpendicularly with respect to one another. This has the effect that a simplified configuration of the respective contact surface is possible. In particular, the basic body can be configured as a tab-shaped basic body with an L-shaped cross section. Associated contact surfaces of the individual interfaces, i.e. with the spoiler kinematics on the one side and with the spoiler blade on the other side, can thereby be configured to be flat or substantially flat, and therefore not only the production of the basic body, but also the retrospective installation can be simplified.

It is furthermore of advantage if, in the case of a connecting device according to an embodiment of the invention, an alignment axis of the alignment interface is arranged parallel or substantially parallel to the setting axis of the at least one setting means. A simplification can also be achieved here in respect of the structural possibilities. The complexity of the entire system of the connecting device is likewise simplified. By means of the correlation of the individual axes in this manner according to this embodiment, the complexity of the individual installation movements is furthermore reduced, and therefore, for corresponding access possibilities, even fewer or smaller access spaces are sufficient for carrying out the installation movement.

It is furthermore of advantage if, in the case of a connecting device according to an embodiment of the invention, the fastening interface and/or the alignment interface have/has a flat or substantially flat extent. As has already been explained, in such an embodiment, the basic body can have, for example, an L-shaped cross section. This results in a tab-like design of the basic body and in correspondingly simple and cost-effective production possibilities. At the same time, the individual flat extents can have a guiding functionality. In particular, a flat correlation can be provided with corresponding contact surfaces of the alignment body and/or of the spoiler kinematics, and therefore the correspondingly contacting flat surfaces can slide on each other in a guiding contact connection during the alignment and/or the setting.

A further advantage is provided if, in the case of a connecting device according to an embodiment of the invention, the spoiler interface has an XY clearance in the X direction and the Y direction for fastening the spoiler blade in at least two different XY relative positions with respect to the basic body. In particular, this correlates with a form-fitting contact connection between the alignment body and an associated receptacle in the spoiler blade. Owing to the fact that the spoiler interface on the basic body is already fixedly defined, it can be ensured by the associated XY clearance that a spoiler blade which is alignable in different XY relative positions in the XY direction also remains further fastenable by means of the same fixedly arranged spoiler interfaces on the basic body. The XY clearance of the spoiler interface therefore enables the relative positioning by means of the alignment body for the spoiler blade.

Embodiments of the present invention likewise relate to a method for connecting an adjustable spoiler blade to a vehicle with a connecting device according to an embodiment of the invention, having the following steps: aligning the alignment body in the X direction and in the Y direction relative to the basic body, fastening the alignment body in the aligned XY relative position to the basic body via the alignment interface, releasing the fastening at the fastening interface, setting the Z relative position of the basic body relative to the spoiler kinematics with the at least one setting means, fastening the basic body to the spoiler kinematics in the set Z relative position.

Through use of a connecting device according to an embodiment of the invention, the same advantages are achieved as have already been explained with respect to connecting devices according to embodiments of the invention.

Figure 1:
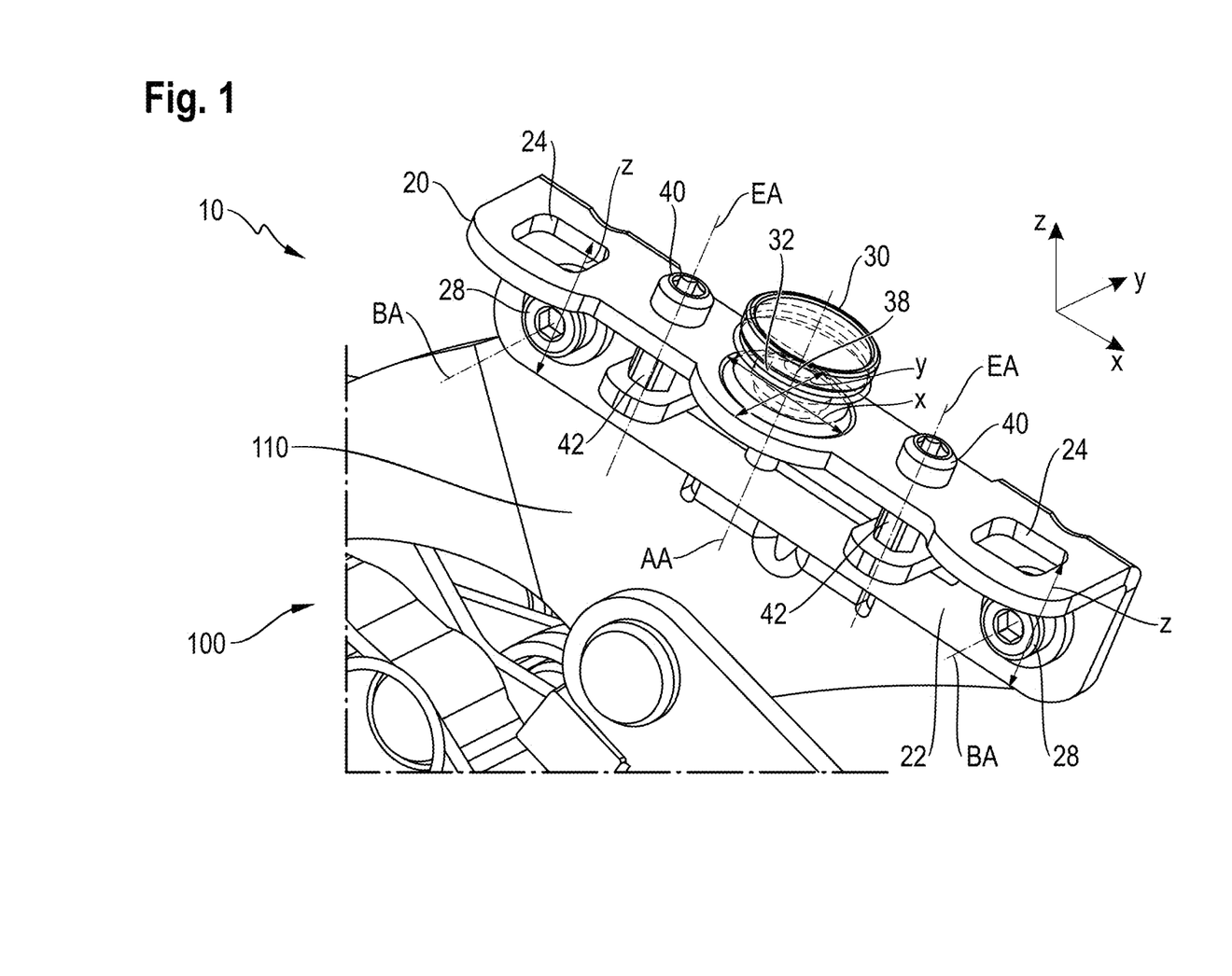
FIG. 1 shows an embodiment of a connecting device according to an embodiment of the invention.
Figure 2:
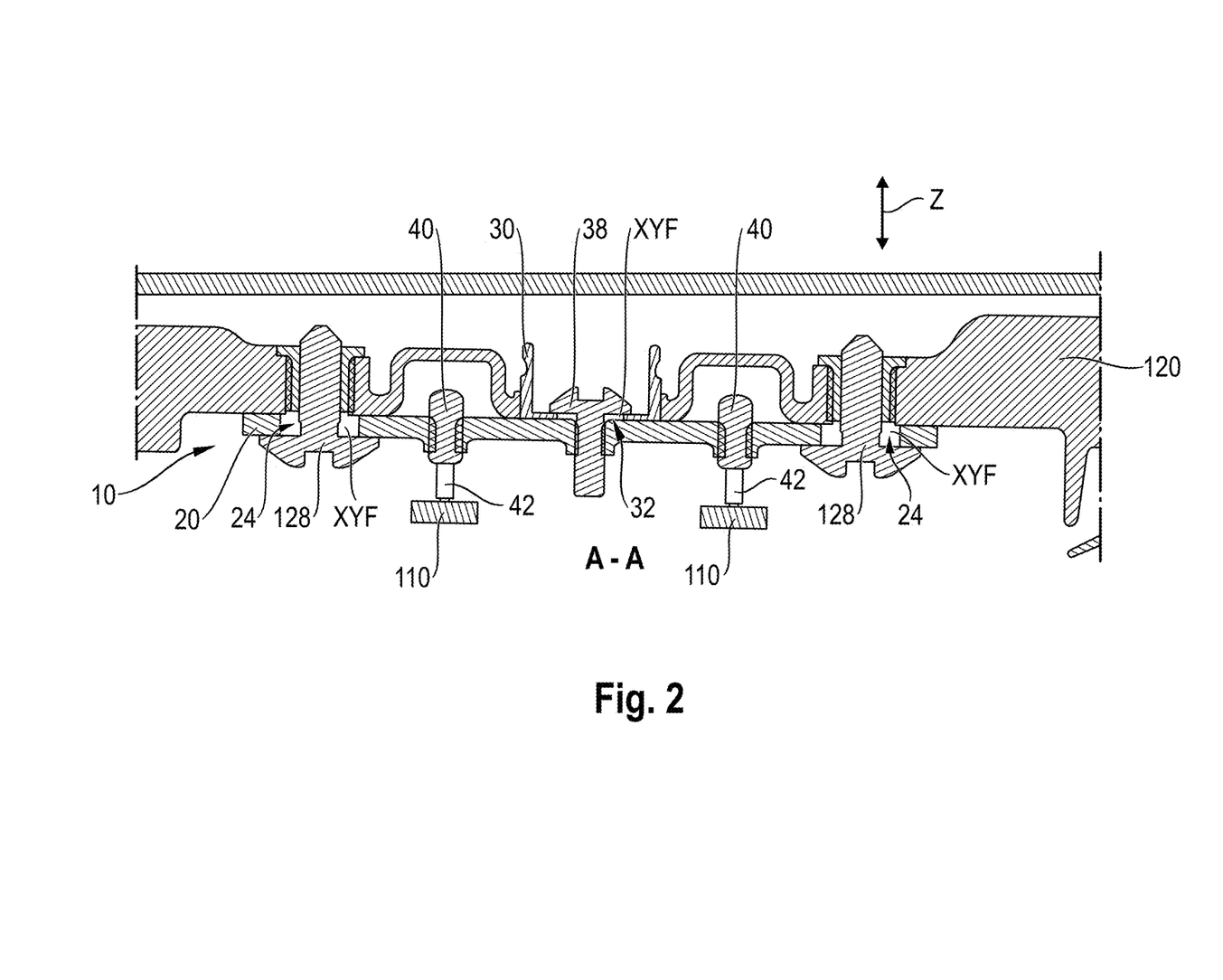
FIG. 2 shows the embodiment of FIG. 1 in a schematic cross section.
Figure 3:
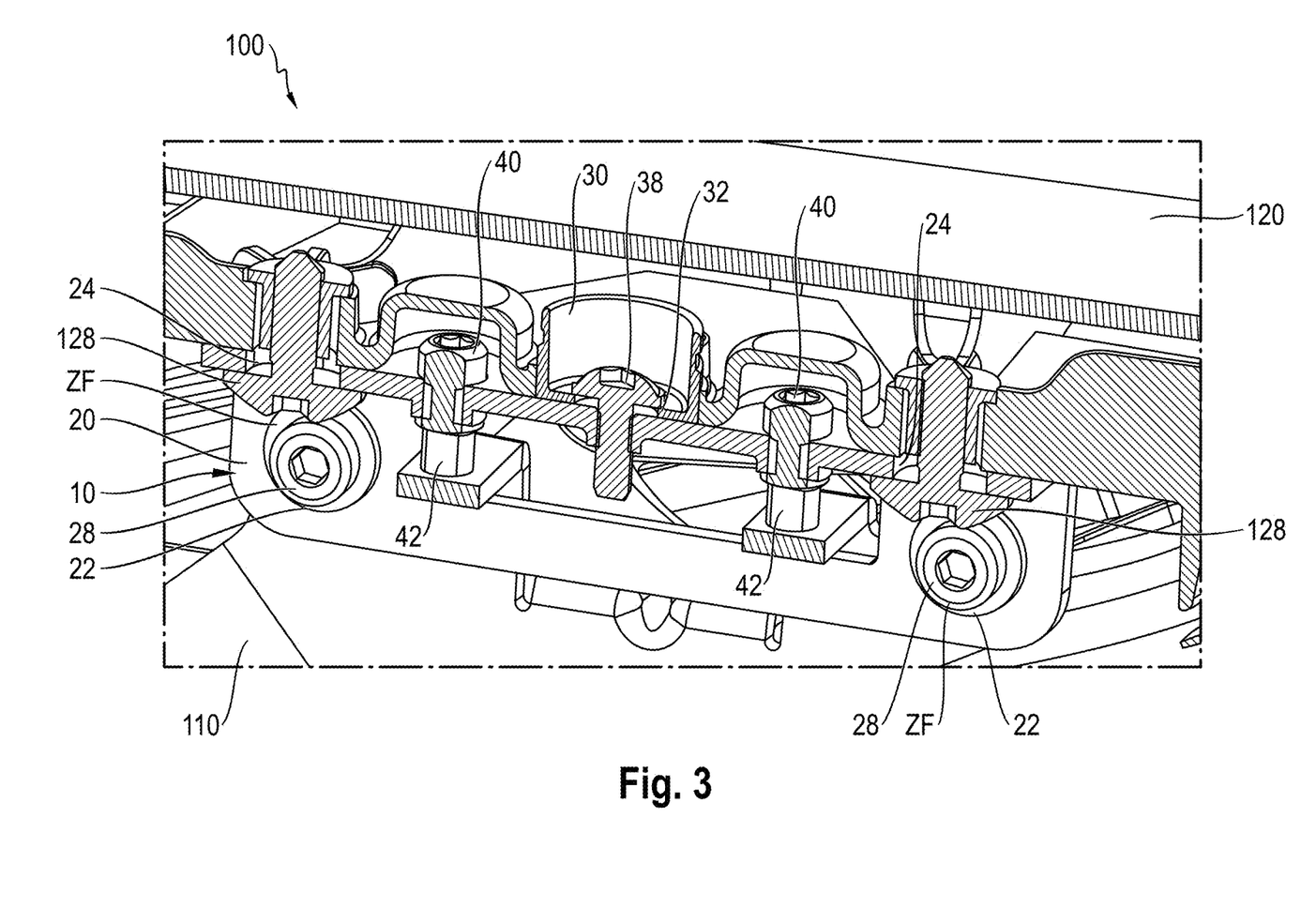
FIG. 3 shows the embodiments of FIGS. 1 and 2 when the spoiler blade is fitted.
Figure 4:
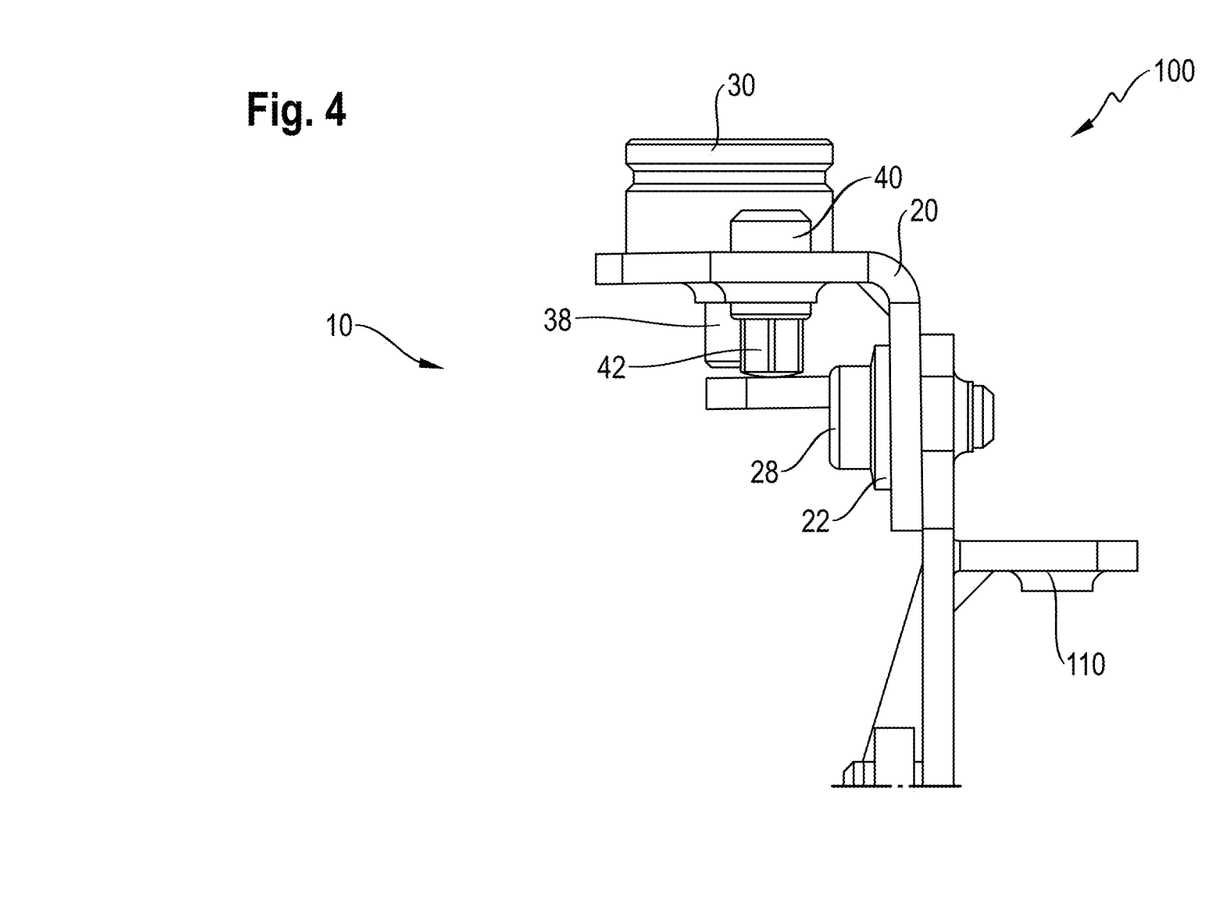
FIG. 4 shows the embodiments of FIGS. 1 to 3 in a lateral illustration.
Figure 5:
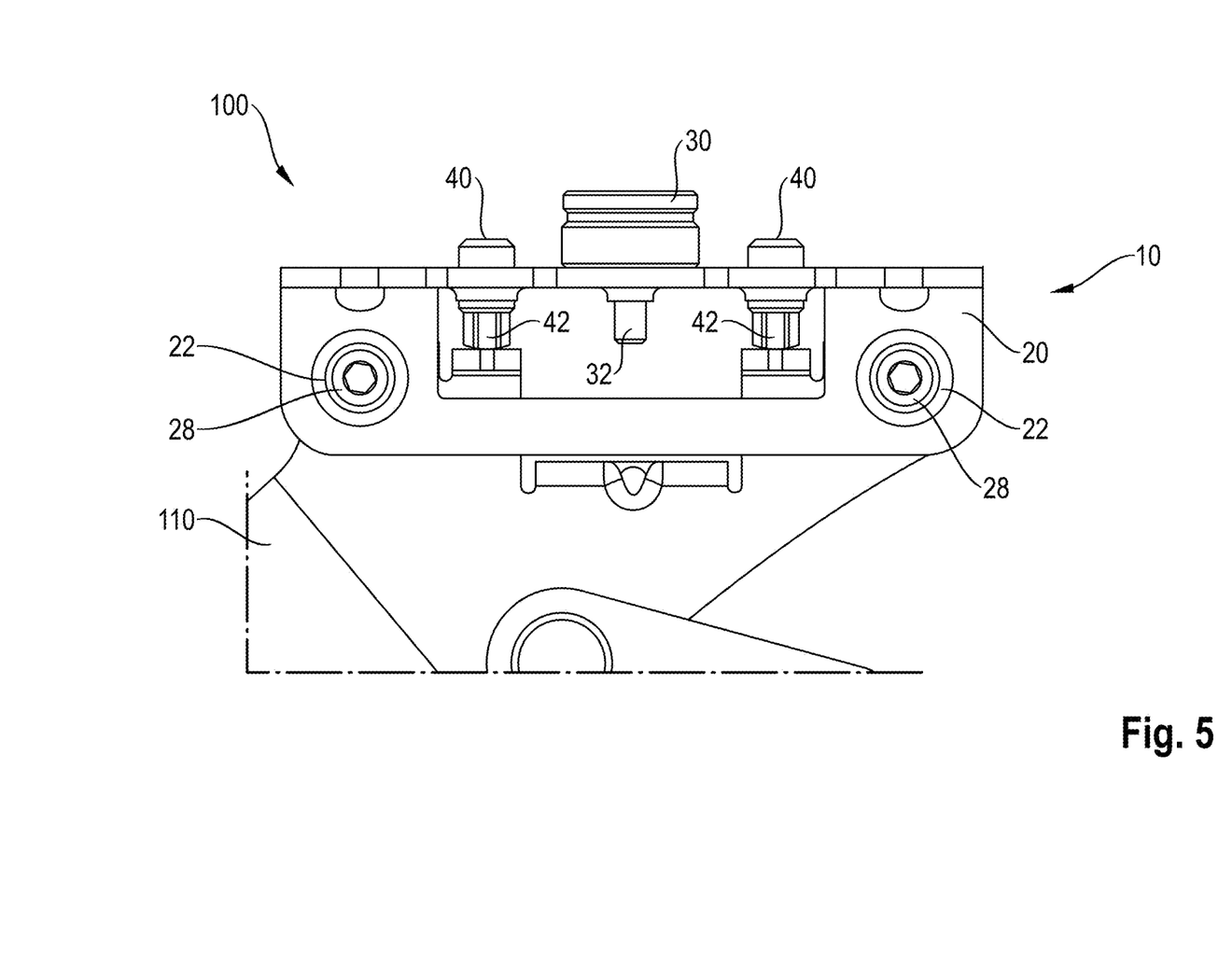
FIG. 5 shows the embodiments of FIGS. 1 to 4 in a different view.

FIGS. 1 to 5 show an embodiment of a connecting device 10 according to an embodiment of the invention. In FIGS. 2 and 3, the spoiler blade 120 is illustrated already in the fitted position. The carrying out of a method for connecting the spoiler blade 120 is explained in more detail with respect to the figures, in particular FIGS. 1, 2 and 3. The starting point here is the situation as FIG. 1 shows. Spoiler kinematics 110 are provided there on a vehicle 100. A basic body 20 is fastened to said spoiler kinematics 110 via associated fastening interfaces 22. Two fastening interfaces 22 are provided here which are fastened to the spoiler kinematics 110 via screws as fastening means 28. The associated fastening axes BA are aligned here in the Y direction of the system of coordinates X, Y, Z.

The basic body 20 is furthermore configured with a substantially L-shaped cross section. An alignment body 30 is provided on the upper portion of said L-shaped cross section. Said alignment body 30 is provided with an alignment interface 32, as can be seen in the cross section in particular in FIGS. 2 and 3. The alignment interface 32 has an associated XY clearance, XYF, which is ensured by an enlarged opening cross section of the opening of the alignment point 32 relative to the outer cross section of the fastening means 38, here the fastening screw. In order to be able to provide an alignment of the alignment body 30 in an XY direction, the fastening means 38 of the alignment interface 32 is now released to an extent such that a relative displacement of the alignment body 30 with respect to the basic body 20 can be carried out. As soon as the desired relative position in the XY direction has been reached, said XY relative position is fixed by the fastening means 38 being tightened again, and therefore a fixing fastening of the alignment body 30 in the aligned XY relative position takes place. The alignment axis AA and the setting axes EA are aligned here in the Z direction of the system of coordinates X, Y, Z.

It is then possible for a setting also to take place in the Z direction irrespective of whether the spoiler blade 120 has or has not been fastened already. In order to carry this out, the two screws as fastening means 28 of the fastening interfaces 22 are loosened until a setting of the relative position can now also be carried out in the Z direction between basic body 20 and spoiler kinematics 110. In order to completely displace the connecting device 10 and therefore the basic body 20 in the Z direction, two setting means 40 are provided here. The setting means 40 are provided here with threads which engage in associated internal thread inlets of the basic body 20. In particular FIGS. 2, 3, 4 and 5 show how the individual setting means 40 press in a contacting manner against latching lugs of the spoiler kinematics 110. As soon as a rotational movement of the individual setting means 40 is then carried out, the relative position of the latter changes by means of a translational sliding movement. The translation has the effect that, by means of the counterpressure of the latching lugs of the spoiler kinematics 110, which is now the contact, the basic body 20 is moved in a translational direction in the Z direction. This can of course be carried out in both directions.

As can be gathered in particular from FIGS. 2 and 3, the setting can now be provided with the aid of contact portions 42. For this purpose, the contact portions 42 have a corresponding wrench width for contact connection with a fork wrench. In the active position of the spoiler kinematics 110, said contact portions are reachable even if the spoiler blade 120 is already attached to the basic body 20.

As FIGS. 2 and 3 show particularly clearly, an interlocking receiving portion which receives the alignment body 30 in an interlocking manner is provided on the spoiler blade 120. Said interlocking receptacle serves to transmit the XY relative position in its aligned manner in its alignment functionality to the XY relative position of the spoiler blade 120. In order not to be fixed to a single relative position in the XY direction in respect of the fastening of the spoiler blade 120, the corresponding spoiler interfaces 24 also have XY clearances XYF. The corresponding fastening interfaces 22 are equipped with associated Z clearances ZF, as FIG. 3 schematically shows.

The above explanation of the embodiments describes the present invention exclusively within the scope of examples. Of course, individual features of the embodiments, if technically meaningful, can be freely combined with one another without departing from the scope of the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A connecting device for connecting an adjustable spoiler blade to a vehicle, the connecting device comprising:
   a basic body including:
      a fastening interface having a Z clearance in a Z direction for fastening to spoiler kinematics of the vehicle in at least two different Z relative positions with respect to the spoiler kinematics, wherein an alignment body is fastened to the basic body, and
      an alignment interface having an XY clearance in an X direction and a Y direction for fastening in at least two different XY relative positions with respect to the basic body,
   wherein the basic body has a spoiler interface for fastening of the spoiler blade and furthermore at least one adjuster for setting a Z relative position.

2. The connecting device as claimed in claim 1, wherein the Z clearance of the fastening interface and/or the XY clearance of the alignment interface are configured for a free selection of a Z relative position and/or an XY relative position between in each case two end positions.

3. The connecting device as claimed in claim 1, wherein at least one of the Z clearance and the XY clearance has an opening cross section that is greater than an outer cross section of an associated fastener.

4. The connecting device as claimed in claim 1, wherein the at least one adjuster includes at least two adjusters having setting threads arranged on two different sides of the alignment body.

5. The connecting device as claimed in claim 1, wherein the at least one adjuster has a contact portion for force-transmitting contact with a contact of the spoiler kinematics for carrying out setting of the Z relative position, wherein the contact portion is arranged on a different side of the basic body than the alignment body.

6. The connecting device as claimed in claim 1, wherein a fastening axis of the fastening interface is aligned transversely with respect to an alignment axis of the alignment interface and/or transversely with respect to a setting axis of the at least one adjuster.

7. The connecting device as claimed in claim 1, wherein an alignment axis of the alignment interface is arranged parallel to a setting axis of the at least one adjuster.

8. The connecting device as claimed in claim 1, wherein the fastening interface and/or the alignment interface have a flat or substantially flat extent.

9. The connecting device as claimed in claim 1, wherein the spoiler interface has an XY clearance in the X direction and the Y direction for fastening the spoiler blade in at least two different XY relative positions with respect to the basic body.

* * * * *